(12) United States Patent
Moran

(10) Patent No.: US 6,632,092 B2
(45) Date of Patent: Oct. 14, 2003

(54) PROPELLED-PIVOTING MOTION BASE WITH ROTATING DISC AND METHOD

(76) Inventor: Gregory Kristen Moran, 1957 E. Andreas Rd., Palm Springs, CA (US) 92262

(*) Notice: Subject to any disclaimer, the term of this patent is extended or adjusted under 35 U.S.C. 154(b) by 0 days.

(21) Appl. No.: 09/886,720

(22) Filed: Jun. 22, 2001

(65) Prior Publication Data

US 2002/0197585 A1 Dec. 26, 2002

(51) Int. Cl.[7] .............................................. G09B 19/16
(52) U.S. Cl. ............................. 434/55; 434/62; 472/59
(58) Field of Search ................................ 472/59, 60, 61, 472/131, 77, 78; 434/29, 55, 43, 34; 463/7

(56) References Cited

U.S. PATENT DOCUMENTS

| | | | |
|---|---|---|---|
| 3,436,841 A | * | 4/1969 | Whitmore et al. ............ 434/34 |
| 4,601,663 A | | 7/1986 | Allison |
| 5,025,876 A | | 6/1991 | Barnard |
| 5,479,668 A | | 1/1996 | Cooper |
| 5,823,884 A | * | 10/1998 | Ager ............................ 472/77 |
| 5,921,780 A | | 7/1999 | Myers |
| 5,997,303 A | * | 12/1999 | Yoshida et al. ............... 434/61 |
| 6,042,382 A | * | 3/2000 | Halfhill ........................ 434/55 |
| 6,095,926 A | | 8/2000 | Hettema |

* cited by examiner

Primary Examiner—Kien T. Nguyen

(57) ABSTRACT

A propelled-pivoting motion base with a rotating disc that provides an occupant with an unlimited range of motion on the horizontal plane of movement and a method for manipulating the inertia of a center mass by physically following a natural path of motion as it occurs in realtime. The vehicle chassis base is propelled and steered upon and along the available operating floor area using two main drives which alternatively propell and pivot each drive assembly in a manner that shifts the center mass and its' inertia when changing directions on the horizontal plane of movement along its' realtime motion path, thus reducing the computational resources normally needed to remove un-natural movenment.

4 Claims, 5 Drawing Sheets

PROPELLED-PIVOTING MOTION BASE WITH ROTATING DISC AND METHOD

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND—FIELD OF INVENTION

This invention relates to the field of computer simulation hardware and software. Simulator mechanical makeup and the motion control devices and software used to operate them. Also, the methods that are used to dissipate the inertia of that motion. Military and Commercial aviation training simulators, simulators for Theme and/or Amusement Parks, Arcade simulators.

BACKGROUND—DESCRIPTION OF THE RELATED ART

Throughout the history of motion base technology many different approaches to simulating motion have been tried. Since the 1970's the motion base of preference for simulating motion in serious training applications has been the limited range tilt-axis platforms which usually have 6 degrees of freedom with a limited range of movement. The process of synchronizing the center mass's movements with the graphics display using these limited range of movement bases is a very complex task. It has to be done in real-time in order to make the training effective which has made the simulation process at this end of the spectrum much more demanding in performance requirements and more expensive than a entertainment type simulator. For the purpose of comparison with the present invention, all of these motion bases share one single property in common. They all have stationary non-propelled bases that either have a limited range of motion on a horizontal plane of movement or none at all. Horizontal and vertical transitional motion is an integral component or part of the simulation process when it comes to training simulators used by the Military, NASA and Commercial aviation applications. Without a certain amount of it, using a simulator with rotational angles on a pitch roll or yaw axis would cause the onset of motion sickness. Many people seeking a thrill on some entertainment motion simulators with extreme rotation angles such as the R360 by SEGA or the Orbitron have gotten motion sickness from the disorientating effects given off by these stationary platforms that rotate an occupant 360 degrees on a roll, pitch or yaw axis without any transitional horizontal or vertical motion. The present invention seeks to change that somewhat by making unlimited motion on a horizontal plane available in any direction for any stationary base simulator that wants it.

SUMMARY

In accordance with the present invention, a propelled-pivoting motion base with a rotating disc for providing 360 degrees of unlimited motion on a horizontal plane of movement to an occupant. Additionally, a different method and mechanical approach to dissipating the inertia of the center mass during the simulation process both physically and computationally when compared to stationary motion bases.

OBJECTS AND ADVANTAGES a.) Providing Unlimited Translational Motion on a Horizontal Plane of Movement The ability of the present invention to move about the operating area freely means a more realistic feeling of motion to the occupant, a higher degree of "fidelity" or realism to the simulation experience especially when immersed in a 3D environment.

b.) Reducing The Computational Tasks for Dissipating a Center Mass's Horizontal Inertia This applies to the more serious Military and Commercial flight training simulators that use a tilt axis platform controlled by hydraulic actuators. In dealing with requirements put forth by the Military, the operation of a "high fidelity" system needs to respond quickly in providing a motion cue. That motion cue must have a certain amount of power to it when delivered. Immediately after delivery, that cue's inertia must be dissipated correctly in time for the next motion cue to take place. It's some very sophisticated programming for some highly responsive actuators. The use of "washout filters" for controlling the actuators movement and inertia, must be continually processed during the simulation exercise in order to provide real-time responses. The availability of unlimited transitional motion on a horizontal plane of movement, using the present invention, allows for the dispersion of the horizontal inertia in a machine like way over a wider area the same way each time in an automatic or robotic manner. Pre-programmed to follow a natural path of movement and disperse the inertia more efficiently without the need to wash out any un-natural movement.

c.) Providing Large Centrifugal Forces

The propelled-pivoting vehicle chassis base and it's two main drives can pivot on either drive wheel delivering large centrifugal force to the occupant in either direction. Using the present invention, in it's preferred embodiment, large sustained centrifugal force will be available for turning maneuvers.

DRAWING FIGS.

Figure 1:
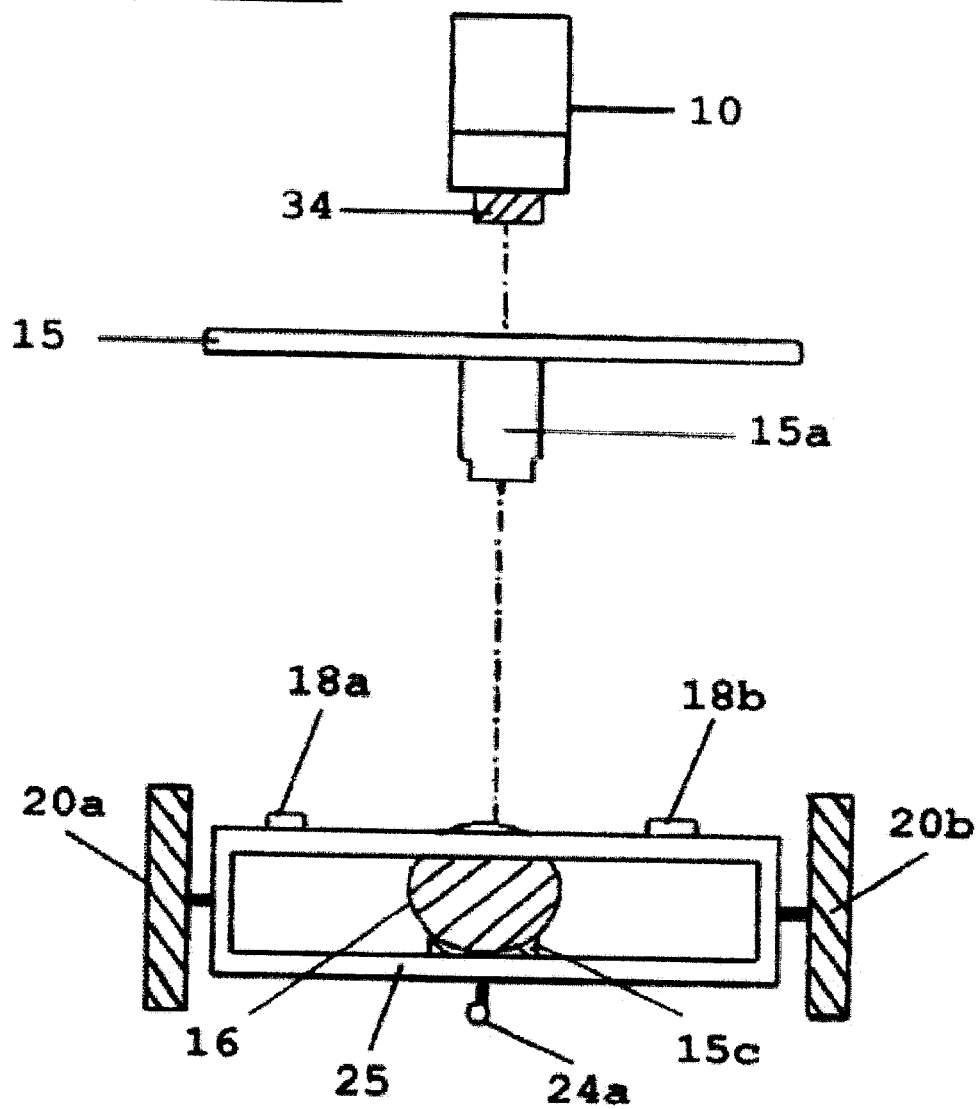
FIG. 1 shows a front view of the propelled motion base with center hub for receiving rotating disc with shaft pin that mounts vertically down into it and rests upon a single drive wheel and roller bearings.

REFERENCE NUMERALS IN DRAWING 10 seat
15 disc
15a. shaft pin
15c. hub
16. rotating disc drive assembly 18a–18h. roller bearings (typ.)
20a. vehicle chassis base drive assembly with forward and reverse capability
20b. vehicle chassis base drive assembly with forward and reverse capability
24a. caster wheel
24b. caster wheel
25. vehicle chassis base
30. rotating axis (typ.)
32. steering gear
34. drive control interface

DESCRIPTION—FIGS. 1–3 PREFERRED EMBODIMENT

FIG.1 Starting with the vehicle chassis base 25 the main drives 20a and 20b are used as propulsion means for the vehicle chassis base 25. A control interface 34 coordinates the actions of the various drives. Keeping the propelled vehicle chassis base 25 level to the ground are two caster wheels 24a and 24b aligned perpendicular to the propelled base's two main drives 20a and 20b. Some roller bearings (typical) 18a and 18b are shown protruding above the top of the propelled vehicle chassis base and are level with the drive wheel of the drive assembly 16 which is used to rotate disc 15 right or left. A shaft pin 15a is mounted underneath disc 15 which is made to fit down into hub 15c of the propelled vehicle chassis base 25. A seat 10 is mounted to the rotating disc 15 which rotates the occupant.

Figure 2:
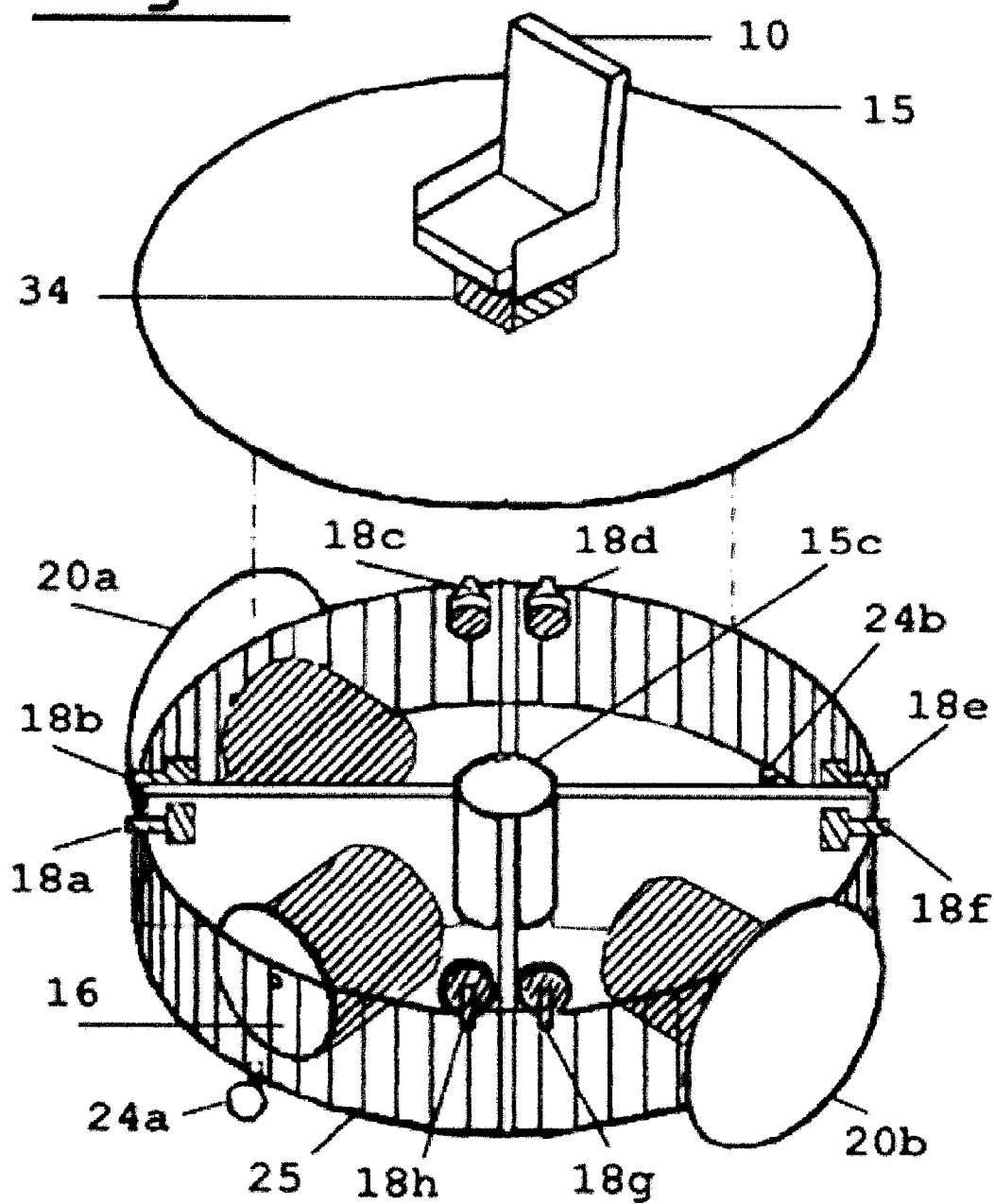
FIG. 2 shows a right isometric exploded view of the propelled motion base with the center hub more clearly shown as well as the single drive for the rotating disc.

FIG.2 A view better showing the various components inside the propelled vehicle chassis base 25. Specifically the center hub 15c which is used as a centering means to receive the disc pin 15a. (not shown). The two main drives 20a and 20b both have forward and reverse properties and serve as propulsion means for steering and propelling the vehicle chassis base 25, they are connected to a control interface 34 for managing the various drive assemblies. The various roller bearings 18a–18h are used as support means for the edge of the rotating disc 15. The drive assembly 16 with forward and reverse capabilities is connected to control interface 34 and used as means to rotate the disc 15 and the seat 10 in a right or left direction independent of the propelled-pivot ing vehicle chassis base 25.

Figure 3:
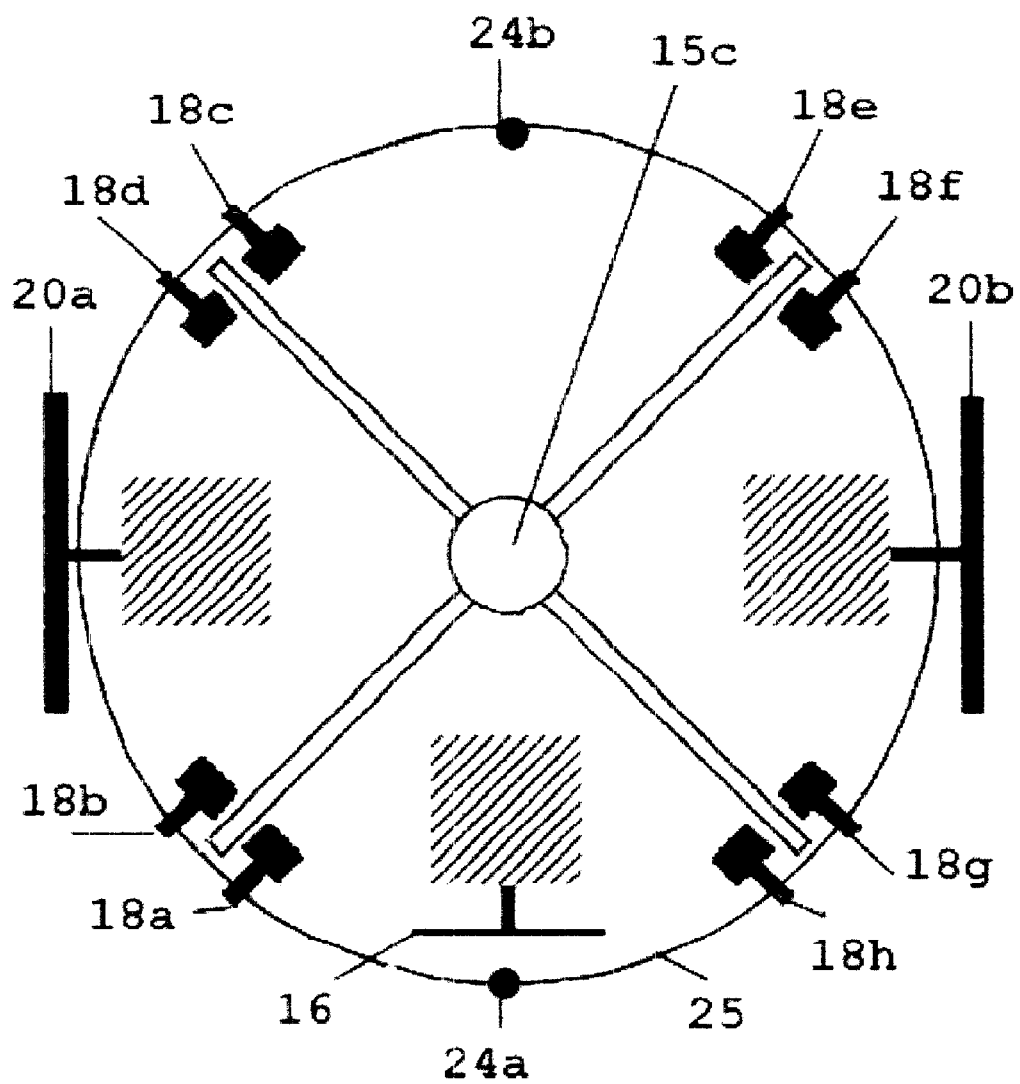
FIG. 3 shows a top view of the propelled base in the preferred embodiment without the rotating disc.

FIG.3 A top view of the propelled-pivoting vehicle chassis base 25 with surrounding roller bearings 18a–18h used as support means for the edge of the rotating disc 15. The two main drives 20a and 20b are used as propulsion and steering means for the vehicle chassis base 25 as well as drive 16 as rotating means for the disc 15.

Figure 4:
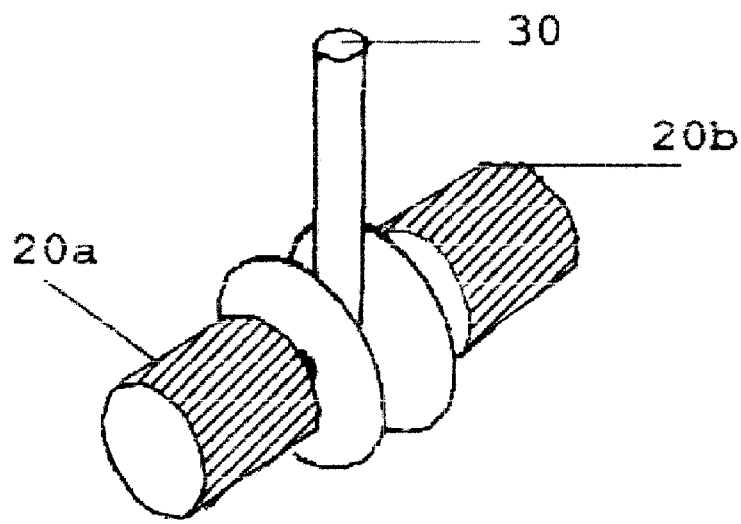
FIG. 4 shows an alternative arrangement for the drive assemblies whereby they would propel and steer the base from the center of the base in a pivoting motion. In another arrangement this combination could be off-center of the base and used in a swiveling motion.
Figure 5:
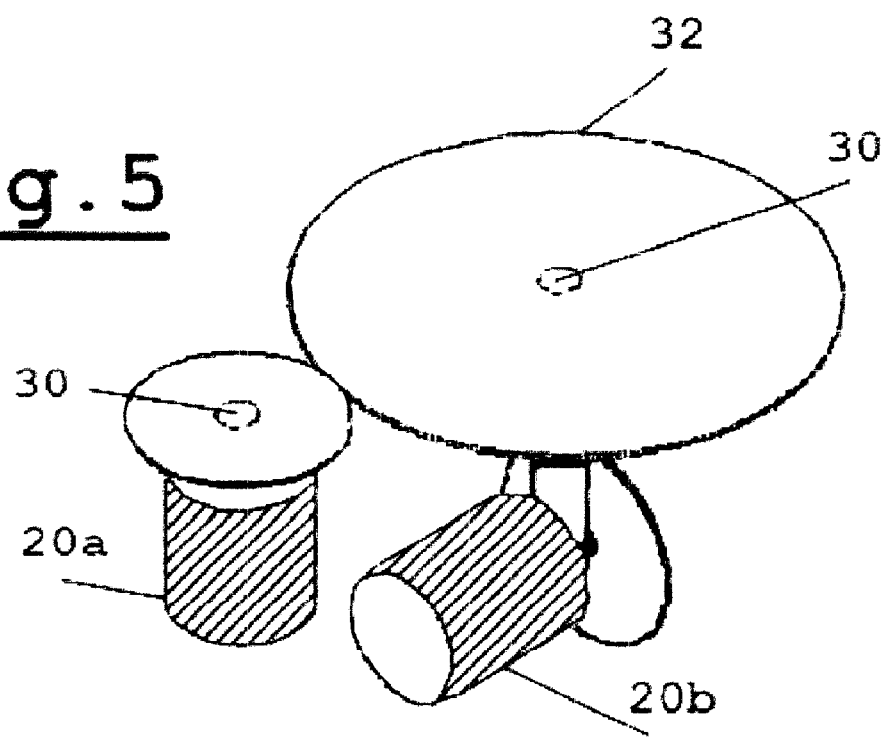
FIG. 5 shows an alternative arrangement for the drive assemblies whereby they would propel and steer the base, off center of the base in a swiveling motion.

DESCRIPTION—FIGS. 4–5 ALTERNATIVE EMBODIMENTS OF DRIVE ASSEMBLIES FOR PROPELLED VEHICLE CHASSIS BASE

FIG.4 A view of an alternative arrangement of the two main drive assemblies as means for propelling and steering the vehicle chassis base 25. Drives 20a and 20b are brought more closely together for placement in the center of the vehicle chassis base 25 This arrangement could also be used off center of the base 25 in a swiveling manner for propelling the vehicle chassis base 25 with a variable number of caster type wheels being used as leveling means for the rest of the vehicle chassis base 25.

FIG.5 Shows an alternative arrangement of the two main drives 20a and 20b with 20b as propelling and steering means for the vehicle chassis base 25. A single drive assembly wheel contacts the ground as propulsion means for the vehicle chassis base 25. Drive 20a is used as a steering means for rotating and controlling the steering gear 32 of drive assembly 20b.

Figure 6:
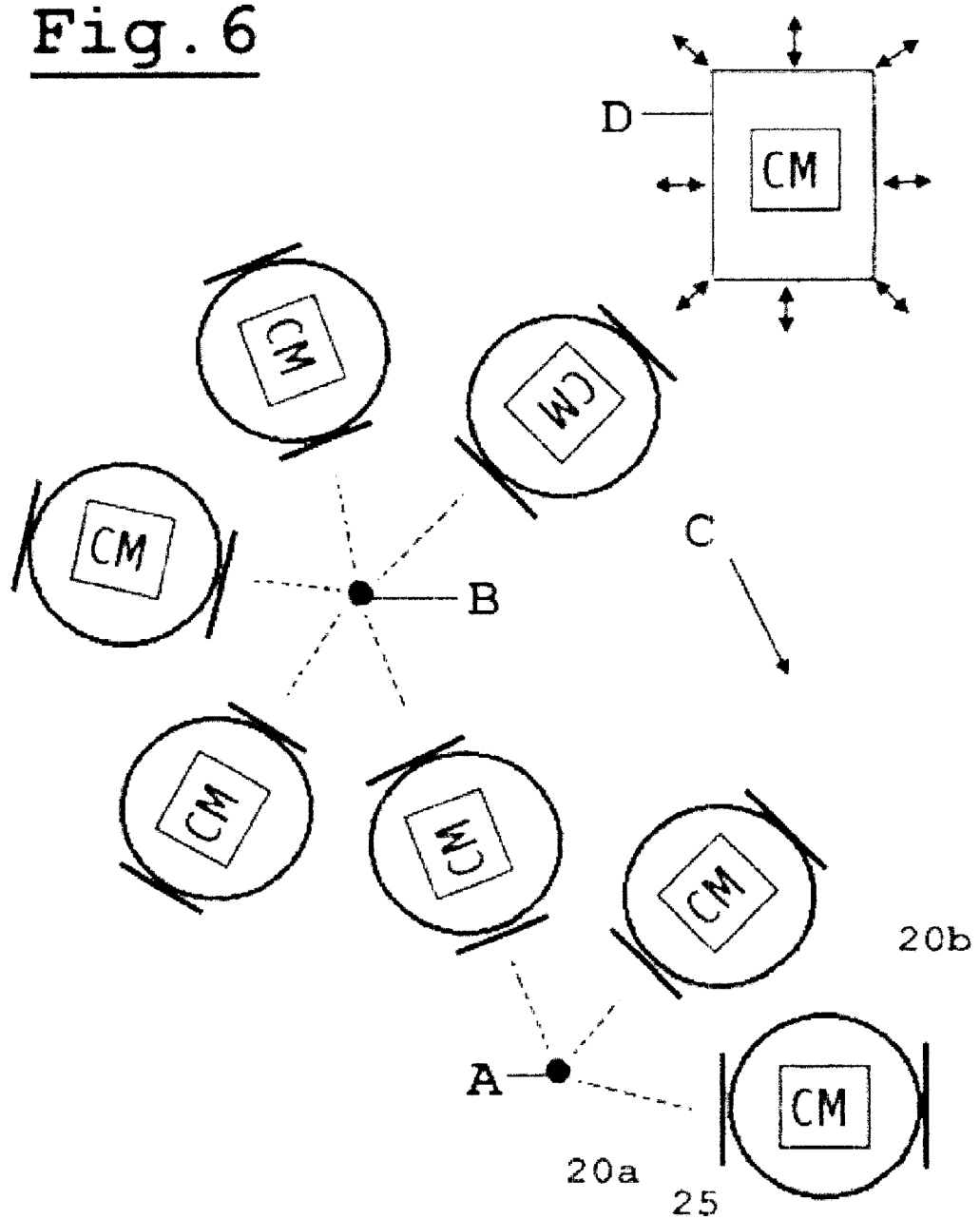
FIG. 6 Illustrates the present inventions method of manipulating the center mass differently than stationary motion bases by moving the center mass away from the center of the operating area and not just the center of the motion base itself. This method disperses the inertia along a natural path of movement verses an un-natural path.

FIG.6 Overhead view of the inertia dispersing methods used by the present invention and existing stationary platforms.

ADVANTAGES

From the description above a number of advantages of my propelled-pivoting motion base with rotating disc and method becomes more evident. In using the large operating area required by my motion base the horizontal plane of movement can be exploited as a means to dissipate the inertia of a center mass in a more energy efficient manner compared to a stationary base having to push and pull the center mass back and forth quickly. In following a large circular path the inertia can be dissipated gradually over a wider area of movement. The center mass can change directions quickly by shifting the weight of the center mass in a pivoting action rather than the push and pull method of existing simulators. Due to the extra room or area to manipulate the center mass it can be dispersed along a path that follows the exact motion pattern as it occurs in real-time. There is no need to constantly cushion the motion of the horizontal platform using algorithms (washout filters) to control hydraulic actuators, because their are no hydraulics being used. This method of using a propelled vehicle chassis base represents a new mechanical approach to manipulating a center mass during the simulation process. This method of simulating motion specifically calls for moving the entire platform away from and back to the center of the operating area and not just the center of the platform. This method is intended to reduce or eliminate many of the computational tasks that are normally needed for controlling the motion and inertia of the center mass using a tilt-axis platform. These platforms must deliver or provide real-time response motion cues. They are of vital importance and play an intrical part in these more advanced simulator applications.

In using the present invention, unlimited horizontal motion is made available to the sensory organs of the middle ear(vestibular)of the occupant and heighten the occupants simulation experience base upon the addition of added realism to the process. The more realism that can be physically provided means that there will be less reality to simulate by the computers being used and thus makes this approach more computationally efficient to use. This propelled-pivoting motion base with its' rotating disc and method can provide centrifugal force in both directions without stopping the inertia to change directions. It does this in a pivoting manner between the invention's two main drive assemblies inter-action with each other. The present invention can also provide large sustained gravitational effects for turning maneuvers.

An occupant wearing a HMD, a head mounted display, will feel more comfortable while immersed in a 3D virtual environment. The unlimited horizontal movement allows for the inertia of the center mass to dissipate following the natural real-time motion path of the vehicle or craft being simulated.

Simulation of helicopter and other vertical takeoff or landing crafts motions can be mimicked more completely thus increasing the fidelity of the simulation experience for these applications.

OPERATION—FIGS. 1, 2, 3, 4, 5, 6

FIG. 1 Starts off at the bottom with the vehicle chassis base 25, a structural framework to be used as a means of housing two drive assemblies 20a and 20b. These two drive assemblies 20a and 20b have forward and reverse capabilities as propulsion and steering means for the vehicle chassis base 25 in the appropriate direction on a horizontal plane of movement. Caster type wheels 24a and 24b are used as a means of supporting the bottom of the base 25 where needed. Supporting the outer edge of rotating disc 15 are a variable number of roller bearings 18a–18b(typ) which are used as a means of supporting the outer edge of the disc 15. Drive assembly 16 with forward and reverse capability is used as a means of rotating the disc 15 and any object attached to it, in the appropriate direction 360 degrees.

FIG. 2 This isometric view of the present invention gives better detail as to the base 25 and the positioning of the main drives 20a and 20b. The caster wheels 24a and 24b are used as a means of leveling the base 25 with the floor. The two drives 20a and 20b both have forward and reverse capability and are used as a means to propel and steer the base 25 around the operating area. The center hub 15c of the base 25 is to receive the pin 15a of the rotating disc 16 whereby it will provide 360 degrees of rotation. It rests upon a variable number of roller bearings 18a–18h as support means for the rotating disc 15. A drive assembly 16 with forward and reverse capability uses a drive wheel as rotating means for the disc 15, which in turn rotates the seat 10.

FIG. 3 Top view of chassis base 25 with all components except for the rotating disc 15 and the seat 10. The chassis base 25 which is propelled by the two main drives 20a and 20b. Caster wheels 24a and 24b are shown perpendicular to the drives 20a and 20b. The upper rim of the base 25 is fitted with roller bearings 18a–18h as a means of supporting the outer edge of the disc 15 as it is rotated by drive 16 with forward and reverse capability. The center hub 15c (female component) is used to receive the pin 15a (male component) of the rotating disc 15.

FIG. 4 This alternative parallel arrangement of the two main drives 20a and 20b are shown closer together with the rotating axis 30. The motors can run in the same direction to provide forward and reverse propulsion of the chassis base 25. Then in an opposing rotating direction to one another they can steer the base 25 in the desired direction. This arrangement with the rotating axis 30 can be housed in the center or off center of the base 25.

FIG. 5 This alternative perpendicular arrangement of the two main drives 20a and 20b closely resembles the drive of some forklifts. The drive 20a is used as a means to turn a larger radius gear 32 in order to steer drive 20b in the right direction around the axis 30. Drive 20b has forward and reverse capabilities as a means to propel the chassis base 25. This arrangement with the rotating axis 30 can be housed in the center or off center of the vehicle chassis base 25.

FIG. 6 Illustrates the present invention's method of dispersing the center mass's inertia compared to a stationary base. The letter A represents the pivoting point of turning left. The letter B represents the changing of the pivoting point to the opposite drive assembly and then Turning right. This method shifts the center mass's inertia just as it occurs in real-time. The letter C represents the propelled motion base returning to the center of the operating area. The letter D illustrates how a stationary base manipulates the center mass in a push-pull action which is un-natural and requires washout filters to help smooth out the un-natural movements and make it feel like an aircraft or other vehicle or craft.

CONCLUSION, RAMIFICATIONS AND SCOPE

The unlimited transitional horizontal movement of the present invention allows using pre-programmed robotic motion sequences that dissipate the center mass's inertia. This method is in direct contrast with existing real-time military training platforms and others that use washout filters as a means to manage actuator movement and dissipate the center mass's inertia. The washout filters are software algorithms that require continuous updating throughout the simulation process, they control the limited transitional motion of the 6 degrees of freedom platforms. They make sure the platform is ready to go for the next maneuver by dissipating the center mass's inertia quickly thus cutting down the time allotted for the actual motion cue to last. Their elimination from the simulation process would go a long way in reducing the amount of processing power needed to run these real-time training and scientific research simulators.

The present invention can provide centrifugal force for turning maneuvers in opposite directions without having to stop, which is not the case with existing centrifuges that have elongated arms and a capsule attached to the end of them. The present invention using this method to change the direction of the center mass's inertia can also provide sustained gravitational effects for turning maneuvers. The largest contribution that the present invention will make to the world of motion base technology is in the field of virtual reality. The ability to physically move about the horizontal plane of the operating area in any direction means that a larger range of motion cues can be provided for a longer period of time to the simulation process making it more life like.

Simulation of helicopter and other vertical takeoff or landing craft's motions can be mimicked more completely thus increasing the fidelity of the simulation experience.

I claim:

1. A method for physically manipulating the inertia of a center mass during a real time simulation application using in combination, an un-restricted available operating floor area, an alternatively propelled-pivoting motion base as propulsion means, comprising the steps of:

a) providing a vehicle chassis base with attachment means for attaching two independent drive assemblies thereto;
   b) providing a center mass to be manipulated by said vehicle chassis base;
   c) providing two independent drive assemblies each having forward and reverse capabilities as propulsion means for said vehicle chassis to transverse said unrestricted operating floor area;
   d) providing a variable number of caster wheels attached to the bottom of said vehicle chassis base as support means for keeping the vehicle chassis base level with said operating floor area;
   e) providing a drive control interface as coupling means for real time input commands to said independent drive assemblies;
   f) alternatively propelling and pivoting said two independent drive assemblies whereby said vehicle chassis base changing directions on said un-restricted operating area, the center mass and the inertia of said vehicle chassis base are shifted in the desired direction.

2. The method of claim 1 wherein providing a seat for an occupant on said vehicle chassis base.

3. The method of claim 1 wherein the step of alternatively propelling and pivoting including only pivoting said two independent drive assemblies.

4. The method of claim 1 wherein the step of alternatively propelling and pivoting including swiveling said two independent drive assemblies.

* * * * *